(12) United States Patent
Sercel et al.

(10) Patent No.: US 11,608,196 B2
(45) Date of Patent: Mar. 21, 2023

(54) DIRECTING LIGHT FOR THERMAL AND POWER APPLICATIONS IN SPACE

(71) Applicant: Trans Astronautica Corporation, Lake View Terrace, CA (US)

(72) Inventors: Joel C. Sercel, Lake View Terrace, CA (US); James G. Small, Sonoita, AZ (US); Philip J. Wahl, Altadena, CA (US)

(73) Assignee: Trans Astronautica Corporation, Lake View Terrace, CA (US)

( * ) Notice: Subject to any disclaimer, the term of this patent is extended or adjusted under 35 U.S.C. 154(b) by 0 days.

(21) Appl. No.: 17/382,727

(22) Filed: Jul. 22, 2021

(65) Prior Publication Data
US 2022/0024612 A1    Jan. 27, 2022

Related U.S. Application Data

(60) Provisional application No. 63/055,231, filed on Jul. 22, 2020.

(51) Int. Cl.
*B64G 1/40* (2006.01)
*H02S 40/22* (2014.01)
(Continued)

(52) U.S. Cl.
CPC .............. *B64G 1/407* (2013.01); *B64G 1/40* (2013.01); *B64G 1/443* (2013.01); *B64G 1/54* (2013.01);
(Continued)

(58) Field of Classification Search
CPC .......... H02S 40/22; H02S 40/44; F24S 20/20; F24S 20/30; B64G 1/54; B64G 1/407; B64G 1/40; B64G 1/443
See application file for complete search history.

(56) References Cited

U.S. PATENT DOCUMENTS 2,930,187 A    3/1960  Chillson
2,975,592 A    3/1961  Fox
(Continued)

FOREIGN PATENT DOCUMENTS

AU    2007200666 A1    8/2007
CN    103075816        5/2013
(Continued)

OTHER PUBLICATIONS

Alternative Scenarios Utilizing Nonterrestrial Resources Charles H. Eldred and Barney B. Roberts, Space Resources Scenarios NASA 1992.

(Continued)

*Primary Examiner* — Alfred Basichas
(74) *Attorney, Agent, or Firm* — Knobbe, Martens, Olson & Bear, LLP

(57) ABSTRACT

Solar collectors can provide power for electricity, thermal propulsion, and material processing (e.g., mining asteroids). In one aspect, an apparatus for collecting solar energy and simultaneously protecting against damage from a resulting energy beam includes a solar energy collection system including at least one concentrator and a target configured to use, store, or convert the solar energy, the collection system configured to cause solar energy to focus on the target, at least one sensor configured to detect misalignment of the concentrator by determining that some or all of the collected solar energy is offset from the target, and a safety system configured to redirect the energy or interpose a safety structure for shielding other non-target systems from receiving too much solar energy from the collection system.

27 Claims, 9 Drawing Sheets

(51) Int. Cl.
  B64G 1/54  (2006.01)
  B64G 1/44  (2006.01)
  *F24S 20/20*  (2018.01)
  *H02S 40/44*  (2014.01)
  *F24S 20/30*  (2018.01)

(52) U.S. Cl.
  CPC .............. *H02S 40/22* (2014.12); *F24S 20/20* (2018.05); *F24S 20/30* (2018.05); *H02S 40/44* (2014.12)

(56) References Cited

U.S. PATENT DOCUMENTS

| | | |
|---|---|---|
| 2,991,617 A | 7/1961 | Rad |
| 3,063,521 A | 11/1962 | Fuller |
| 3,064,418 A | 11/1962 | Sanders |
| 3,564,253 A | 2/1971 | Buckingham |
| 3,597,923 A | 8/1971 | Simon |
| 4,013,885 A * | 3/1977 | Blitz .................... G01S 3/7861 250/203.4 |
| 4,135,489 A | 1/1979 | Jarvinen |
| 4,286,581 A | 1/1981 | Atkinson, Jr. |
| 4,449,514 A * | 5/1984 | Selcuk .................... F24S 20/20 126/571 |
| 4,459,972 A | 7/1984 | Moore |
| 4,528,978 A | 7/1985 | Robinson |
| 4,564,275 A * | 1/1986 | Stone .................... G01S 3/7861 353/3 |
| 4,781,018 A | 11/1988 | Shoji |
| 4,815,443 A * | 3/1989 | Vrolyk .................. B64G 1/446 126/697 |
| 5,047,654 A | 9/1991 | Newman |
| 5,138,832 A | 8/1992 | Pande |
| 5,202,541 A | 4/1993 | Patterson |
| 5,266,762 A | 11/1993 | Hoffman |
| 5,305,970 A | 4/1994 | Porter et al. |
| 5,459,996 A | 10/1995 | Malloy, III |
| 5,511,748 A | 4/1996 | Scott |
| 5,593,549 A | 1/1997 | Stirbl et al. |
| 5,674,794 A | 10/1997 | Chatterjee |
| 5,751,895 A | 5/1998 | Bridges |
| 5,861,947 A * | 1/1999 | Neumann ................ F24S 20/20 356/216 |
| 5,982,481 A * | 11/1999 | Stone ...................... F24S 23/71 356/152.2 |
| 6,057,505 A | 5/2000 | Ortabasi |
| 6,193,193 B1 | 2/2001 | Sorrano |
| 6,343,464 B1 | 2/2002 | Westerman |
| 6,350,973 B2 | 2/2002 | Wroe |
| 6,532,953 B1 | 3/2003 | Blackmon et al. |
| 6,669,148 B2 | 12/2003 | Anderman et al. |
| 6,742,325 B2 | 6/2004 | Kudija, Jr |
| 7,207,327 B2 * | 4/2007 | Litwin .................... F24S 50/00 126/601 |
| 7,387,279 B2 | 6/2008 | Anderman et al. |
| 7,575,200 B2 | 8/2009 | Behrens et al. |
| 7,823,837 B2 | 11/2010 | Behrens et al. |
| 8,033,110 B2 | 10/2011 | Gilon et al. |
| 8,357,884 B1 | 1/2013 | Ethridge |
| 8,379,310 B2 | 2/2013 | Mori et al. |
| 9,010,317 B1 * | 4/2015 | Gross .................... F24S 50/20 126/573 |
| 9,187,191 B1 | 11/2015 | Jensen et al. |
| 9,222,702 B2 | 12/2015 | Goldberg |
| 9,266,627 B1 | 2/2016 | Anderson |
| 9,409,658 B1 | 8/2016 | Diamandis et al. |
| 9,581,021 B2 | 2/2017 | Ethridge |
| 9,676,499 B2 | 6/2017 | Myers et al. |
| 9,709,771 B2 * | 7/2017 | Corrigan ................. F24S 23/79 |
| 10,654,596 B1 | 5/2020 | Eller |
| 10,989,443 B1 | 4/2021 | Sercel et al. |
| 11,391,246 B2 | 4/2021 | Sercel et al. |
| 11,085,669 B2 | 8/2021 | Sercel |
| 11,143,026 B2 | 10/2021 | Sercel et al. |
| 11,280,194 B2 | 3/2022 | Sercel |
| 2002/0075579 A1 | 6/2002 | Vasylyev et al. |
| 2002/0184873 A1 | 12/2002 | Dujarric |
| 2003/0029969 A1 | 2/2003 | Turner |
| 2003/0224082 A1 | 12/2003 | Akopyan |
| 2004/0004184 A1 | 1/2004 | Schubert |
| 2004/0231716 A1 | 11/2004 | Litwin |
| 2008/0023060 A1 * | 1/2008 | Grumazescu ....... H01L 31/0547 136/246 |
| 2008/0156315 A1 | 7/2008 | Yangpichit |
| 2010/0038491 A1 | 2/2010 | Cepollina et al. |
| 2010/0252024 A1 * | 10/2010 | Convery ................. F24S 50/20 126/578 |
| 2010/0269817 A1 | 10/2010 | Kelly |
| 2010/0294261 A1 * | 11/2010 | Deforge ................ F24S 30/425 126/651 |
| 2010/0319678 A1 | 12/2010 | Maemura et al. |
| 2011/0031238 A1 | 2/2011 | Segawa |
| 2011/0041894 A1 | 2/2011 | Liao |
| 2011/0220091 A1 | 9/2011 | Kroyzer |
| 2011/0315678 A1 | 12/2011 | Furuya |
| 2012/0155966 A1 | 6/2012 | Zillmer |
| 2013/0021471 A1 * | 1/2013 | Waterhouse ............ F24S 50/20 348/139 |
| 2013/0206209 A1 | 8/2013 | Lasich |
| 2013/0239952 A1 * | 9/2013 | Kroyzer ................. F24S 20/20 126/714 |
| 2014/0138952 A1 | 5/2014 | Marumoto |
| 2014/0150651 A1 | 6/2014 | Velasco Valcke |
| 2014/0174430 A1 | 6/2014 | Fitzgerald et al. |
| 2014/0262278 A1 | 9/2014 | Walton |
| 2014/0318127 A1 | 10/2014 | Kerns |
| 2015/0027102 A1 | 1/2015 | Bahn et al. |
| 2015/0180114 A1 | 6/2015 | Achour |
| 2016/0010442 A1 | 1/2016 | Kearl |
| 2016/0024921 A1 | 1/2016 | Ethridge |
| 2016/0076792 A1 | 3/2016 | Magaldi |
| 2016/0121395 A1 | 5/2016 | Kawanaka |
| 2018/0194626 A1 | 7/2018 | Berggren et al. |
| 2018/0265224 A1 | 9/2018 | Foulds et al. |
| 2019/0271228 A1 | 9/2019 | Sowers, Jr. et al. |
| 2021/0061494 A1 | 3/2021 | Belieres Montero |
| 2021/0333019 A1 | 10/2021 | Sercel et al. |
| 2022/0082019 A1 | 3/2022 | Sercel et al. |
| 2022/0089302 A1 * | 3/2022 | Sercel ..................... B64G 1/443 |
| 2022/0090500 A1 | 3/2022 | Sercel |
| 2022/0268524 A1 | 8/2022 | Small |
| 2022/0275721 A1 | 9/2022 | Sercel |
| 2022/0290635 A1 * | 9/2022 | Sercel ..................... F02K 9/64 |

FOREIGN PATENT DOCUMENTS

| | | |
|---|---|---|
| EP | 2 177 846 | 4/2010 |
| EP | 2 195 583 | 3/2013 |
| JP | 2012-038954 | 2/2012 |
| JP | 2019-148155 | 9/2019 |
| RU | 02353775 | 4/2009 |
| WO | WO 16/172647 | 10/2016 |
| WO | WO 20/033561 | 2/2020 |

OTHER PUBLICATIONS

Antarctic Meteorite Sample, Investigator's Guidebook, Astromaterials Research and Exploration Science Directorate KA, Astromaterials Acquisition and Curation Office/KT, JSC-66468, Lyndon B. Johnson Space Center, Houston TX.

Arnold, J.R., "Ice in the lunar polar regions", J. Geophys. Res 84., 1979, pp. 5659-5668.

Badescu, V., "Asteroids: Prospective Energy and Material Resources," Jul. 14, 2013, ISBN-13:978-3642392438.

Binzel, R., "Human Spaceflight: Find Asteroids to get to Mars." Nature 514, 559-561, Oct. 29, 2014.

Bliss, T., et al. "Experimental validation of robust resonance entrainment for cpg-controlled tensegrity structures." IEEE Transactions On Control Systems Technology, 2012, vol. 21(3), pp. 666-678.

Bottke, W.F., et al., Debiased orbital and Absolute Magnitude Distribution of the near-Earth objects, Icarus 156, 399-433, 2002.

(56) References Cited

OTHER PUBLICATIONS

Bowersox, Kenneth and NASA Advisory Council Committee on Human Exploration and Operations, "NASA Advisory Council Finding on NASA Human Exploration Strategy," from the Council Public Deliberation, Jul. 31, 2014.

Boyle, A., "Blue Origin Space venture slips in a sneak peek at design of Blue Moon lunar lander", Apr. 5, 2017, https://www.geekwire.com/2017/blue-origin-sneak-peek-blue-moon-lunar-lander/.

Boyle, A., "Jeff Bezos lays out his vision for city on the moon, complete with robots", May 20, 2017, https://www.geekwire.com/2017/jeff-bezos-blue-origin-moon/.

Brophy, J., et al., "Spacecraft Conceptual Design for Returning Entire Near-Earth Asteroids," 48th AIAA/ASME/SAE/ASEE Joint Propulsion Conference & Exhibit and 10th International Energy Conversion Engineering Conference, Atlanta, George Jul. 29-Aug. 1, 2012.

Brown, P., et al., The Flux of small near-Earth objects colliding with the Earth, Nature 420, 294-296, 2002.

Bussey, D. B. J., et al., "Permanent shadow in simple craters near the lunar poles," Geophysical Research Letters, 2003, vol. 30, No. 6, 1278, pp. 11-1-11-4.

Cassapakis, C.G., et al., "A Power Antenna for Deep Space Missions," Solar Engineering Editors: J.H. Davidson and J. Chavez. Book No. HO1046, 1996.

Ceruti, Conceptual Design and Preliminary Structural Analysis of Inflatable Basket for an Asteroid Capturing Satellite; Strojniški vestnik—Journal of Mechanical Engineering 61(2015)5, 341-351 Received for review: Jul. 17, 2014; ©2015 Journal of Mechanical Engineering; DOI:10.5545/sv-jme.2014.2063; in 11 pages.

Chen, L.H., et al., Soft spherical tensegrity robot design using rod-centered actuation and control, Journal of Mechanisms and Robotics, 2017, vol. 9(2) pp. 025001.

Chen, M., et al., "Energy analysis of growth adaptable artificial gravity space habitat," AIAA Space and Astronautics Forum and Exposition, 2018, in 13 pages.

Cohen, Marc M., et al., "Asteroid Mining," AIAA 2013-5304, presented at AIAA Space 2013 Conference and Exposition, Sep. 10-12, 2013, San Diego, CA.

Colaprete, A., et al., "Detection of water in the Icross ejecta plume," Science, vol. 330, pp. 463-468, Oct. 22, 2010.

Court, R.W., et al. "Volatile Yields upon Pyrolysis of Carbonaceous Chondrites as Determined by Quantitative Pyrolysis-Fourier Transform Infrared Spectroscopy" presented at the 40th Lunar and Planetary Science Conference, 2009.

Craft, J., et al. "Percussive digging systems for planetary research" IEEE Aerospace and Electronic Systems Magazine, 2010, vol. 25 pp. 21-26.

Crawford, I.A., Lunar resources: A review. Progress in Physical Geography, 39(2):137-167, 2015.

Crusan, J., "an Evolvable Mars Campaign" NASA Presentation, Jul. 2014, available at https:/www.nasa.gov/sites/default/files/files/20140429-Crusan-Evolvable-Mars-Campaign.pdf.

David, "Asteroid-Mining Plan Would Bake Water Out of Bagged-Up Space Rocks." Space.com, Sep. 18, 2015 (Sep. 18, 2015), pp. 1-5 [online] <URL: http://www.space.com/30582-asteroid-mining-water-propulsion.html>.

Duke, M., et al., "Mining of lunar polar ice", 36th AIAA Aerospace Sciences Meeting and Exhibit, 1998, pp. 1069.

Ehricke, K.A., "The Solar-Powered Space Ship," ARS Paper 310-56, Jun. 1956.

Eldred, et al., "Alternative Scenarios Utilizing Nonterrestrial Resources", Space Resources Scenarios NASA, 1992.

Erickson, K., "Optimal Architecture for an Asteroid Mining Mission: Equipment Details and Integration" Collection of Technical Papers—Space Conference 2006, Sep. 19-21, 2006, San Jose, California; AIAA 2006-7504; in 17 pages.

Etheridge, F.G., "Solar-Rocket System Concept Analysis", Final Report on AFRPL Contract F04611-79-C-0007, AFRPL-TR-79-79, Rockwell International, Space Systems Group, Downey CA 90241, Nov. 1979.

Ethridge, E. C., et al., "Microwave Extraction of Volatiles for Mars Science and ISRU. Concepts and Approaches for Mars Exploration". Concepts and Approaches for Mars Exploration; Jun. 2012, pp. 2-14, Houston, TX; United States.

FAA 2012 Commercial Space Transportation Forecasts. Available at http://www.faa.gov/about/office_org/headquarters_offices/ast/media/The_Annual_Compendium_of_Commercial_Space_Transporation_2012.pdf.

Fabbrocino, F., et al., "Optimal prestress design of composite cable-stayed bridges". Composite Structures, 2017, vol. 169, pp. 167-172.

Feldman, W. C., et al., (1998). "Fluxes of fast and epithermal neutrons from Lunar Prospector", Evidence for water ice at the lunar poles, science 281, 1998, pp. 1496-1500.

Fincannon, J., "Lunar Polar Illumination for Power Analysis", NASA/TM, 2008-215446, https://ntrs.nasa.gov/archive/nasa/casi.ntrs.nasa.gov/20080045536.pdf.

Fisher, E.A., et al., "Evidence for surface water ice in the lunar polar regions using reflectance measurements from the Lunar Orbiter Laser Altimeter and temperature measurements from the Diviner Lunar Radiometer Experiment", Lunar Polar Volaties, 2018, LBI Contrib. No. 2087.

Fisher, E.A., et al., "Evidence for surface water ice in the lunar polar regions using reflectance measurements from the Lunar Orbiter Laser Altimeter and temperature measurements from the Diviner Lunar Radiometer Experiment", Icarus 292, 2017, pp. 74.

Freeland, R.E., et al., "Large Inflatable Deployable Antenna Flight Experiment Results," (AF Paper 97-1.3.01, presented at the 48th Congress of the International Astronautical Federation, Turin, Italy, Oct. 6-10, 1997.

Freeland, R.E., et al., "Significance of the Inflatable Antenna Experiment Technology", AIAA-98-2104 published in the 39th AIAA/ASME/ASCE/AHS/ASC Structures, Structural Dynamics, and Materials Conference and Exhibit, Apr. 1998.

Garenne, A.B., et al., "The Abundance and Stability of Water in Type 1 and 2 Carbonaceous Chondrites," CI, CM, and CRI Geochimica et Cosmochimica Acta 137, 93-112, 2014.

Gertsch, L.S., et al., Laboratory Demonstration and Test of Solar Thermal Asteroid ISRU, funded NASA Early Stage Innovations Space Tech Research Grants, Proposed 2014, funded Jan. 2015.

Gertsch, R.E., et al., "Near Earth Resources," In Near Earth Objects, Annals of the New York Academy of Science, vol. 822, p. 468-510, 1997.

Gertsch, R.E., et al., "Mining near Earth resources," In Near Earth Objects, Annals of the New York Academy of Sciences, vol. 822, p. 511-537, 1997.

Gläser, P., et al., "Illumination conditions at the lunar poles: Implications for future exploration". Planetary and Space Science, in press, 2017, https://doi.org/10.1016/j.pss. 2017.07.006.

Goyal, R., et al., "Analytical study of tensegrity lattices for mass-efficient mechanical energy absorption", International Journal of Space Structures, 2018.

Goyal, R., et al., "Modeling of tensegrity structures", Journal of Open Source Software, 2019, vol. 4(42), pp. 1613.

Goyal, R., et al., "Tensegrity system dynamics with rigid bars and massive strings", Multibody System Dynamics, 2019, vol. 46(3) pp. 203-228.

Granvik et al., Abstract, IAU-Symposium: Complex Planetary Systems, Jul. 7-11, 2014, Namur, Belgium.

Granvik, M., et al., "The population of natural Earth satellites," Icarus, 2012.

Griffin, M.D., et al., "Space Vehicle Design, Second Edition (AIAA Education)", pp. 29-37, Feb. 23, 2004.

Grip; Modeling and Simulation of Asteroid Capture Using a Deformable Membrane Capture Device; Proceedings of the ASME 2015 International Design Engineering Technical Conferences & Computers and Information in Engineering Conference; IDETC/CIE 2015; Aug. 2-5, 2015; Boston, USA; In 10 pages.

(56) References Cited

OTHER PUBLICATIONS

Grossman, G., et al., "Inflatable Concentrators for Solar Propulsion and Dynamic Space Power." Journal of Solar Energy Engineering, Nov. 1990, vol. 112/229.

Harwood, William, "NASA's proposed asteroid retrieval mission outlined." Posted in Space Flight Now: Apr. 6, 2013. Available at https://spaceflightnow.com/news/n1304/06asteroid/.

Hayne, P. O., et al., "Evidence for exposed water ice in the Moon's south polar regions from Lunar Reconnaissance Orbiter ultraviolet albedo and temperature measurements". Icarus, 2015, vol. 255, pp. 58-69.

Hayne, P.O., et al., "Diviner Lunar Radiometer Observations of the LCROSS Impact", Science 330, 2010, pp. 477.

Heiken, G.H., et al., "Lunar sourcebook-a user's guide to the moon". NASA,. Cambridge, England, Cambridge University Press, 1991, vol. 753, pp No individual items are abstracted in this volume.

Interbartolo III. Michael A, et al, "Prototype Development of an Integrated Mars Atmosphere and Soil-Processing System", Journal of Aerospace Engineering, Jan. 2013, vol. 26(1), pp. 57-66.

Kutter, Bernard, "Transportation and Propellant Resources in the Cislunar Economy", Space Resources Roundtable XIX Planetary & Terrestrial Mining Sciences Symposium. http://www.isruinfo.com/index.php?page=srr_19_ptmss, 2018.

Lawrence, D. J., et al., "Evidence for water ice near Mercury's north pole from messenger Neutron Spectrometer measurements". Science 339, 2013, pp. 292-296.

Lewis, J.A., "Logistical Implications of Water Extraction from Near-Earth Asteroids," Proceedings of the Eleventh SSI-Princeton Conference, May 12-15, 1993.

Lewis, J.A., "Hard Choices for Manned Spaceflight: America as Icarus", http://csis.org/files/publication/140508_Lewis_HardChoicesMannedSpaceflight_Web.pdf, 2014.

Lewis; Mining the Sky; Untold Riches from the Asteroids, Comets, and Planets; Library of Congress Cataloging-in-Publication Data; ISBN 0-201-47959-1; 1996; 66 pages (pp. 7-11, 32, 49-74, 108-127, 134-141, 198-200).

Li, S. et al., "Possible detection of surface water ice in the lunar polar regions using data from the Moon Mineralogy Mapper (M3)," presented at LPSC XLVIII, Mar. 2017, Houston, TX.

Lunar Exploration Advisory Group "Commercial Lunar Propellant Architecture A Collaborative Study of Lunar Propellant Production", Final Report. Aug. 2018.

Masten, Jun. 17, 2021, Break the ice: Masten designs rocket mining system to extract lunar water, blog, 8 pp.

Mazanek et al., "Asteroid Retrieval Mission Concept—Trailblazing Our Future in Space and Helping to Protect Us from Earth Impactors." Planetary Defense Conference 2013, pp. 3, 5 [online] <URL: http://ntrs.nasa.gov/archive/nasa/casi.ntrs.nasa.gov/20130013170.pdf>.

Mazarico, E., et al., "Illumination Conditions of the Lunar Polar Regions Using LOLA Topography." Icarus, vol. 211, No. 2, 2011, pp. 1066-1081., doi:10.1016/j.icarus. 2010.10.030.

Mommert, M., et al., "Constraining the Physical Properties of Near-Earth Object 2009 BD," The Astrophysical Journal, vol. 786, No. 2.

Nagase, K., et al., "Minimal mass tensegrity structures", The International Association for Shell and Spatial Structures, 2014, vol. 55(1), pp. 37-48.

NASA Report from Office of the Chief Technologist, Emerging Space: The Evolving Landscape of 21st Century American Spaceflight, http://images.spaceref.com/docs/2014/Emerging_Space_Report.pdf.

NASA, "Asteroid Redirect Mission Reference Concept," 2013.

Norton, B., "Harnessing Solar Heat," Springer, pages C1-xiii, 39 and 48-73, ISBN 978-007-7275-5, 2013.

Pike R.J., "Crater dimensions from Apollo data and supplemental sources". The Moon, 1976, vol. 15, pp. 463-477.

Pike, R.J., "Depth/diameter relations of fresh lunar craters: Revision from spacecraft data", Geophysical Research Letters, 1974, vol. 1(7), pp. 291-294.

Rapp, D., "Use of Extraterrestrial Resources for Human Space Missions to Moon or Mars (Springer Praxis Books / Astronautical Engineering)" published Nov. 20, 2012.

Reinhold; A Solar Powered Station At A Lunar Pole; Feb. 18, 2021; https://theworld.com/~reinhold/lunarpolar.html; 7 pages.

Rimoli, J.J., et al., "Mechanical response of 3-dimensional tensegrity lattices", Composites Part B: Engineering, 2017, vol. 115, pp. 30-42.

Ross, Shane D., "Near-Earth Asteroid Mining", Caltech Space Industry Report, Dec. 14, 2001, Control and Dynamical Systems Caltech 107-81, Pasadena CA 91125 available at http://www2.esm.vt.edu/-sdross/papers/ross-asteroid-mining-2001.pdf.

Rostami, J., et al., "Lunar tunnel boring machines", In Earth and Space 2018: Engineering for Extreme Environments, American Society of Civil Engineers, pp. 240-252, 2018, Reston, VA,.

Sabelhaus, A.P., et al. "Model-predictive control of a flexible spine robot", American Control Conference, 2017, IEEE, pp. 5051-5057.

Sanders, Oct. 10, 2019, NASA Lunar ISRU Strategy, presented at the What Next for Space Resource Utilization? Workshop, Luxembourg, 20 pp.

Schlaich, M., "The messeturm in Rostock—A tensegrity tower", Journal of the International Association for Shell and Spatial Structures, 2004, vol. 45(2), pp. 93-98.

Sercel, "Demonstration of "Optical Mining" For Excavation of Asteroids and Production of Mission Consumables." NASA SBIR. Apr. 23, 7015 (Apr. 23, 2015), pp. 1-2, [online] <URL: http://sbir.nasa.gov/SBIR/abstracts/15/sbir/phase1/SBIR-15-1-H1 .01-9278.html>.

Sercel, J.C., "Solar Thermal Propulsion for Planetary Spacecraft", presented at the JANNAF Propulsion Conference, San Diego, CA, Apr. 9-12, 1985.

Sercel, J.C., et al., "APIS(Asteroid Provided in-Situ Supplies): 100MT of Water, One Falcon 9 Launch" NIAC Phase 1a proposal submitted Nov. 2014.

Sercel, J.C., et al., "Emerging Space Office Grant (ESO)", "Stepping Stones: Economic Benefits of Asteroid Mining for Exploration of Deep Space" NASA Report, Contract No. NNX16AH11G, 2017.

Sercel, Apr. 22, 2015, Worker Bees: thin-film solar thermal technology enables water-based cis-lunar transportation architecture, ICS Associates Inc., 109 pp.

Sercel; Time Dependent Finite Difference Modeling of Outgassing of Asteroids via Bulk Heating; 978-1-5386-2014-4/18/$31.00 ©2018 IEEE; I 14 pages.

Shao, M.B., et al., "Finding very Small Near-Earth Asteroids using Synthetic Tracking," Astrophysics .J 782:1, 2014, arXiv, 1309.3248.

Shapiro, I and the Committee to Review Near-Earth Object Surveys and Hazard Mitigation Strategies. Final Report, National Research Council, National Academies Press, 2010.

Shoji, J. M., et al., "Solar Thermal Propulsion Status and Future", AIAA-92-1719, AIAA Space Programs and Technologies Conference, Mar. 1992.

Skelton, R.E., Tensegrity Systems, 2009, Springer US.

Sowers et al., 2019, Ice mining in lunar permanently shadowed regions, NewSpace, 7(4):235-244.

Sowers, Jun. 12, 2018, Closing the Business Case for Lunar Propellant, PowerPoint presentation, 13 pp.

Spudis, P., et al., "Evidence for water ice on the moon: Results for anomalous polar craters from the lro mini-rf imaging radar", Journal of Geophysical Research: Planets, 2013, vol. 118(10), pp. 2016-2029.

Squyres, S. and the Nasa Advisory Council, Recommendation Regarding Mismatch Between NASA's Aspirations for Human Space Flight and Its Budget, from the Council Public Deliberation, Jul. 31, 2014.

Staugaitis, C., et al., "Mechanical and Physical Properties of the Echo II Metal-Polymer Laminate (NASA TND-3409)," NASA Goddard Space Flight Center, 1966.

Stoica, A. et al., "TransFormers of Extreme Environments and Their Integration in a Solar Power Infrastructure". AIAA Space 2016, AIAA Space Forum, 2016.

Stoica, A. et al., NIAC Phase II Final Report, Early Stage Innovation, NASA Innovative Advanced Concepts (NIAC), "TransForm-

(56) References Cited

OTHER PUBLICATIONS ers for Lunar Extreme Environments: Ensuring Long-Term Operations in Regions of Darkness and Low Temperatures", Nov. 2017.
Sultan, C., et al., "Deployment of tensegrity structures", International Journal of Solids and Structures, 2003, vol. 40(18), pp. 4637-4657.
Sunspiral, V., et al., "Tensegrity based probes for planetary exploration: Entry, descent and landing (edl) and surface mobility analysis", International Journal of Planetary Probes, 2013, vol. 7, pp. 13.
Taylor, G.J., "Using the Resources of the Moon to Expand Earth's Economic Sphere." Planetary Science Research Discoveries Report (2019): E205. Nov. 14, 2019 http://www.psrd.hawaii.edu/Nov19/PSRD-lunar-isru.pdf.
Thomas, M. et al., "Scaling Characteristics of Inflatable Paraboloid Concentrators", Presented at the Second ASME-JSES-JSME International Solar Energy Conference, Reno, Nevada, Mar. 17-22, 1991.
Tukkaraja, P., et al. Lunar mining and processing for in situ resource utilization, Earth and Space 2018: Engineering for Extreme Environments, American Society of Civil Engineers, 2018, pp. 401-413, Reston, VA.
Vasavada, A. R., et al., "Near-Surface Temperatures on Mercury and the Moon and the Stability of Polar Ice Deposits". Icarus, 1999, vol. 141, pp. 179-193.
Wihite, Alan, et al., Evolved Human Space Exploration Architecture Using Commercial Launch/Propellant Depots, 63rd International Astronautical Congress, Naples, Italy, 2012.
Yildiz, K., et al., "Effective beam stiffness properties of n-strut cylindrical tensegrity towers", AIAA Journal, 2019, vol. 57(5), pp. 2185-2194.
Yildiz, K., et al., "A novel deployment strategy for tensegrity towers", AIAA Spacecraft Structures Conference, 2018, pp. 0693.
Zacny; Asteroid Mining; AIAA Space 2013 Conference and Exposition Sep. 10-12, 2013, San Diego, CA; AIAA 2013-5304; in 16 pages.
Zegler, Frank, et al., "Evolving to a Depot-Based Space Transportation Architecture" AIAA Space 2010 Conference and Exposition. Aug. 30-Sep. 2, 2010, Anaheim, CA, AIAA 2010-8638.

\* cited by examiner

DIRECTING LIGHT FOR THERMAL AND POWER APPLICATIONS IN SPACE

INCORPORATION BY REFERENCE TO ANY PRIORITY APPLICATIONS

This application is based upon and claims the benefit of priority from U.S. Provisional Patent Application No. 63/055,231 filed on Jul. 22, 2020. Moreover, Any and all applications for which a foreign or domestic priority claim is identified in the Application Data Sheet as filed with the present application are hereby incorporated by reference under 37 CFR 1.57. The entire contents of each of the above-listed items is hereby incorporated into this document by reference and made a part of this specification for all purposes, for all that each contains.

BACKGROUND

Field

Aspects of this disclosure relate to systems and methods for precisely directing concentrated solar energy from the sun for use aboard spacecraft and for asteroid mining.

SUMMARY OF CERTAIN INVENTIVE ASPECTS

Commercial economic activity in near-earth space and in regions beyond is growing rapidly. In the inner solar system, industrial levels of continuous solar power may be collected by using light-weight concentrating mirrors. The mirrors may be deployed from orbiting spacecraft or may be installed upon relatively fixed installations such as asteroids or low gravity moons. Light-weight mirror structures can collect powerful energy beams, but their reduced dimensional stability (compared to heavier terrestrial designs) may allow the energy beams to wander off target causing damage to supporting structures. It is desirable to have an active control system that can compensate for dimensional changes.

Aspects of this disclosure provide at least two types of robust sensors for use in feedback control systems. The sensors directly sample the full diameter of the energy beams during high power operation. The first method employs imaging cameras that view small amounts of visible energy which is inadvertently scattered from nominally well-polished optical surfaces. The second method places a fine wire grid across the path of an energy beam and measures resistance changes in the wires due to thermal heating. Both methods may involve determining the energy centroid of an energy beam. In the event of beam wander, both methods can provide electrical error signals which can be used to adjust various optical elements to correct for dimensional drift in light-weight structures. Depending on the particular embodiment, one or both of the methods can be applied to generate the electrical error signals used to adjust the optical elements.

Further aspects of this disclosure provide protective shutters which can be closed to permit progressive alignment of high energy beams throughout a spacecraft beam transport system while protecting the spacecraft structure from unintended damage due to misaligned high energy beams.

Still further aspects of this disclosure provide shutters which can be used to interrupt an energy beam for the purpose of selectively heating nearby light-weight surfaces to eliminate moisture and frost buildup.

In one aspect, there is provided a method for protecting spacecraft against unintentional damage from concentrated solar energy-beams by blocking the beams or preventing the concentration of damaging levels of solar energy whenever the beams could potentially damage spacecraft structures.

In another aspect, there is provided a method for protecting spacecraft against unintentional damage from concentrated solar energy beams.

In some embodiments, a plurality of energy-beam sensors monitor continually the directions of solar energy beams with respect to a spacecraft structure without disrupting the said energy beams during normal spacecraft operations. Data from the sensors may be used to provide pointing and tracking information for solar power collection and may also be used to provide warning alerts and shutdown commands whenever energy beams point in potentially damaging directions.

In some embodiments, physical elements may be rapidly interposed into the beam path of a solar energy collection system in order to prevent the formation of a concentrated beam or to absorb or to harmlessly scatter the concentrated energy. The physical elements may include optical shutters, blocking plates, absorbers, diffusers, or optical elements which deflect or defocus solar energy-beams.

In some embodiments, concentrated solar-energy beams may be blocked with a response time that is shorter than the time for thermal damage to occur in spacecraft structures.

In yet another aspect, a method involves using an imaging camera to continually monitor diffusely scattered light from a nominally specular optical reflecting surface in order to derive adjustment signals for the alignment of optical elements in a solar energy collection system.

In some embodiments, an imaging camera on a spacecraft is used to align a large solar collecting mirror directly at the sun without reference to an additional highly accurate sun tracking device.

In some embodiments, an imaging camera on a spacecraft is used to detect misalignment of a concentrated beam of light on an optically reflecting surface in order to prevent a misdirected solar energy beam that could cause unintended damage to parts of the spacecraft structure.

In some embodiments, an imaging camera on a spacecraft is used to detect and measure misalignment of a concentrated beam of light incident upon a closed protective shutter for the purpose of aligning the beam of light before it can be directed to additional optical elements and thereby reducing the risk of unintended damage to the spacecraft structure.

In some embodiments, an opaque cover plate is placed to temporarily intercept and block a beam of concentrated solar energy, wherein heating of the cover plate and re-radiation of thermal energy from the plate is used to warm nearby surfaces in order to prevent moisture or frost buildup.

In some embodiments, the method involves measuring the position of a concentrated beam of solar energy by means of a grid of fine wires wherein thermal heating of the wires results in electrical resistance changes in the wires.

In some embodiments, a grid of fine wires is disposed across the path of a concentrated beam of solar energy to determine the position of the maximum intensity of the beam.

In still yet another aspect, a rocket propulsion system produces thrust for a spacecraft by directing a concentrated beam of solar energy into a heat exchanger that heats a pressurized propulsion gas which is expelled through a rocket nozzle.

In some embodiments, the concentrated energy beam enters the propulsion system through a transparent window material that functions as a pressure window and may also include curved surfaces to provide a controlled amount of focusing of the energy beam.

In some embodiments, the energy beam passes through a second transparent window that is spaced away from the first window thereby forming a pressurized plenum chamber between the two windows into which a propulsion gas may be injected. The second window is further provided with an array of holes that allow pressurized gas to flow out of the plenum chamber into a further pressure chamber containing the heat exchanger and a rocket nozzle. The array of holes form a turbulence-free protective gas barrier near the output surface of the second window.

In some embodiments, a first propulsion gas is injected into the plenum and a second propulsion gas is injected into the pressure chamber that contains a heat exchanger. The first gas may be formulated to cool the windows and to chemically remove contaminants. The second gas may be a complex mixture of molecules that is derived from asteroid mining processes.

In another aspect, there is provided an apparatus for collecting solar energy and simultaneously protecting against damage from a resulting energy beam, the apparatus comprising: a solar energy collection system comprising at least one concentrator and a target configured to use, store, or convert the solar energy, the collection system configured to cause solar energy to focus on the target; at least one sensor configured to detect misalignment of the concentrator by determining that some or all of the collected solar energy is offset from the target; and a safety system configured to redirect the energy or interpose a safety structure for shielding other non-target systems from receiving too much solar energy from the collection system.

In some embodiments, the safety structure comprises one or more of the following: an optical shutter, a blocking plate, an absorber, a diffuser, and/or an optical element, and wherein the physical element is further configured to deflect and/or defocus the collected solar energy.

In some embodiments, the safety system is further configured to interpose the safety structure with a response time that is shorter than the time for thermal damage to occur in the non-target systems.

In some embodiments, the safety structure is further configured to receive the collected sunlight and radiate thermal energy in order to prevent moisture or ice build up on other portions of the solar power collection system.

In some embodiments, the at least one concentrator is configured to focus the solar energy, the solar energy collection system further comprises at least one reflector configured to reflect the solar energy focused by the at least one concentrator, and the at least one sensor comprises at least one camera having a field of view directed at the at least one reflector.

In some embodiments, the apparatus further comprises: one or more processors configured to: receive image data from the one or more cameras, detect a location of a diffuse glow with respect to the at least one reflector, and determine whether the focused solar energy is misaligned based on the detected location of the diffuse glow.

In some embodiments, the solar energy collection system further comprises: one or more actuators configured to adjust the position and/or rotation of the at least one reflector based on the determination of whether the focused solar energy is misaligned.

In some embodiments, the at least one concentrator is configured to focus the solar energy, the solar energy collection system further comprises at least one reflector configured to reflect the solar energy focused by the at least one concentrator, and the one or more sensors comprise a grid formed of a plurality of wires located adjacent to one of the at least one reflective elements.

In some embodiments, the apparatus further comprises: a circuit configured to measure electrical resistances of each of the plurality of wires, and one or more processors configured to: receive the measured electrical resistances from the circuit, and determine whether the focused solar energy is misaligned based on the measured electrical resistances.

In some embodiments, the solar power collection system further comprises: one or more actuators configured to adjust the position and/or rotation of the at least one reflector based on the determination of whether the focused solar energy is misaligned.

In yet another aspect, there is provided a spacecraft, comprising: an asteroid capture system configured to capture an asteroid; a solar power collection system configured to: collect solar energy from the sun, generate an energy beam from the collected sunlight, and redirect the energy beam into the captured asteroid, wherein the solar power collection system comprises one or more sensors configured to detect misalignment of the energy beam, the solar power collection system further configured to redirect the energy beam based on output of the one or more sensors.

In some embodiments, the solar power collection system further comprises: a physical element configured to selectively prevent the solar power collection system from forming the energy beam in response to the one or more sensors detecting misalignment of the energy beam.

In some embodiments, the physical element comprises one or more of the following: an optical shutter, a blocking plate, an absorber, a diffuser, and/or an optical element, and wherein the physical element is further configured to deflect and/or defocus the collected solar energy.

In some embodiments, the physical element is further configured to prevent the solar power collection system from forming the energy beam with a response time that is shorter than the time for thermal damage to occur in spacecraft structures.

In some embodiments, the physical element is further configured to receive the collected sunlight and radiate thermal energy in order to prevent moisture or ice build up on other portions of the solar power collection system.

In some embodiments, the solar power collection system further comprises: a lenticular structure having a curved reflective surface configured to collect the solar energy and focus the collected solar energy into the energy beam, and at least one reflecting element configured to redirect the energy beam.

In some embodiments, the one or more sensors comprise one or more cameras, the one or more cameras each have a field of view directed at one of the at least one reflecting element.

In some embodiments, the spacecraft further comprises: one or more processors configured to: receive image data from the one or more cameras, detect a location of a diffuse glow with respect to the one of the reflective elements, and determine whether the energy beam is misaligned based on the detected location of the diffuse glow.

In some embodiments, the solar power collection system further comprises: one or more actuators configured to adjust the position and/or rotation of the at least one reflecting element based on the determination of whether the energy beam is misaligned.

In some embodiments, the one or more sensors comprise a grid formed of a plurality of wires located adjacent to one of the at least one reflective elements.

In some embodiments, the spacecraft further comprises: a circuit configured to measure electrical resistances of each of the plurality of wires, and one or more processors configured to: receive the measured electrical resistances from the circuit, and determine whether the energy beam is misaligned based on the measured electrical resistances.

In some embodiments, the solar power collection system further comprises: one or more actuators configured to adjust the position and/or rotation of the at least one reflecting element based on the determination of whether the energy beam is misaligned.

In some embodiments, further comprising: a rocket propulsion system configured to provide rocket thrust, wherein the solar power collection system is further configured to redirect the energy beam into the rocket propulsion system.

In some embodiments, the rocket propulsion system comprises: a rocket nozzle, and a heat exchanger configured to heat a pressurized propulsion gas and expel the heated pressurized propulsion through the rocket nozzle.

In some embodiments, the rocket propulsion system further comprises: a body enclosing the heat exchanger, and a first transparent window configured to provide a pressure seal against the body and provide a controlled amount of focusing of the energy beam to the heat exchanger.

In some embodiments, the rocket propulsion system further comprises: a second transparent window arranged within the body and spaced away from the first transparent window to form a pressurized plenum chamber between the first and second transparent windows, wherein the plenum chamber is configured to receive a first propulsion gas injected therein, wherein the second window has an array of holes formed therein configured to allow the first propulsion gas to flow out of the plenum chamber into a pressure chamber formed in the body and containing the heat exchanger, and wherein the array of holes form a substantially turbulence-free protective gas barrier near an output surface of the second transparent window.

In some embodiments, the pressure chamber is configured to receive a second propulsion gas injected therein, the first gas is configured to cool and remove contaminants from the first and second transparent windows, and the second gas comprises a mixture of molecules derived from asteroid mining processes.

In still yet another aspect, a method for protecting a spacecraft against damage from an energy beam, comprising: collecting solar energy from the sun using a solar power collection system of the spacecraft; generating an energy beam from the collected sunlight using the solar power collection system; redirecting the energy beam into an asteroid captured by an asteroid capture system of the spacecraft; detecting misalignment of the energy beam using one or more sensors; and redirecting the energy beam using the solar power collection system based on output of the one or more sensors.

In some embodiments, the method further comprises: configured to selectively preventing the solar power collection system from forming the energy beam using a physical element in response to the one or more sensors detecting misalignment of the energy beam.

In some embodiments, the physical element comprises one or more of the following: an optical shutter, a blocking plate, an absorber, a diffuser, and/or an optical element, and wherein the physical element is further configured to deflect and/or defocus the collected solar energy.

In some embodiments, the method further comprises: preventing the solar power collection system from forming the energy beam using the physical element with a response time that is shorter than the time for thermal damage to occur in spacecraft structures.

In some embodiments, the method further comprises: receiving the collected sunlight and radiate thermal energy using the physical element in order to prevent moisture or ice build up on other portions of the solar power collection system.

In some embodiments, the method further comprises: collecting and focusing the solar energy using a lenticular structure having a curved reflective surface into the energy beam, and redirecting the energy beam using at least one reflecting element.

In some embodiments, the one or more sensors comprise one or more cameras, the one or more cameras each have a field of view directed at one of the at least one reflecting element.

In some embodiments, the method further comprises: receiving, at one or more processors, image data from the one or more cameras; detecting, at the one or more processors, a location of a diffuse glow with respect to the one of the reflective elements; and determining, using the one or more processors, whether the energy beam is misaligned based on the detected location of the diffuse glow.

In some embodiments, the method further comprises: adjusting the position and/or rotation of the at least one reflecting element using one or more actuators based on the determination of whether the energy beam is misaligned.

In some embodiments, the one or more sensors comprise a grid formed of a plurality of wires located adjacent to one of the at least one reflective elements.

In some embodiments, the method further comprises: measuring electrical resistances of each of the plurality of wires using a circuit; receiving, at one or more processors, the measured electrical resistances from the circuit; and determining, at the one or more processors, whether the energy beam is misaligned based on the measured electrical resistances.

In some embodiments, the method further comprises: adjusting the position and/or rotation of the at least one reflecting element using one or more actuators based on the determination of whether the energy beam is misaligned.

In some embodiments, the method further comprises: providing rocket thrust using a rocket propulsion system; and redirecting the energy beam into the rocket propulsion system.

In some embodiments, the method further comprises: heating a pressurized propulsion gas using a heat exchanger; and expelling the heated pressurized propulsion through a rocket nozzle.

In some embodiments, the rocket propulsion system further comprises: a body enclosing the heat exchanger, and a first transparent window configured to provide a pressure seal against the body and provide a controlled amount of focusing of the energy beam to the heat exchanger.

In some embodiments, the rocket propulsion system further comprises: a second transparent window arranged within the body and spaced away from the first transparent window to form a pressurized plenum chamber between the first and second transparent windows, wherein the plenum chamber is configured to receive a first propulsion gas injected therein, wherein the second window has an array of holes formed therein configured to allow the first propulsion gas to flow out of the plenum chamber into a pressure chamber formed in the body and containing the heat exchanger, and wherein the array of holes form a substantially turbulence-free protective gas barrier near an output surface of the second transparent window.

In some embodiments, the method further comprises: the pressure chamber is configured to receive a second propulsion gas injected therein, the first gas is configured to cool and remove contaminants from the first and second transparent windows, and the second gas comprises a mixture of molecules derived from asteroid mining processes.

These and other features and advantages of the present disclosure will be apparent to those skilled in the art from the following detailed description, taken together with the accompanying drawings, in which like reference numerals refer to like parts.

DETAILED DESCRIPTION

When launching spacecraft by rockets from the surface of the Earth, the spacecraft are typically carried within the aerodynamic nose cone of the launch vehicle. It is desirable to reducing launch costs by minimizing both the total mass of the spacecraft and its physical size. It is therefore useful to employ compact and light-weight structures wherever possible. As used herein, light-weight structures may generally refer to structures having a sufficiently low weight such that the structures can be launched from the Earth to escape from the gravitational influence of Earth using one or more rockets.

Aspects of this disclosure relate to systems and techniques for collecting solar energy and protecting against damage resulting from an energy beam formed form the collected solar energy. Although examples of such systems and techniques are described in connection with an asteroid mining spacecraft, aspects of this disclosure are not limited thereto.

For example, the systems and techniques described herein can also be applied to solar collection systems that are installed temporarily or permanently on an asteroid or a moon. As described herein, there may be situations in which focused solar energy may have sufficient power to damage components which do not form part of the optical path for the solar energy, for example, due to misalignment of one or more components in the system. Thus, aspects of this disclosure can provide systems and techniques for preventing such damage from occurring in many different solar energy collection systems.

Figure 1:
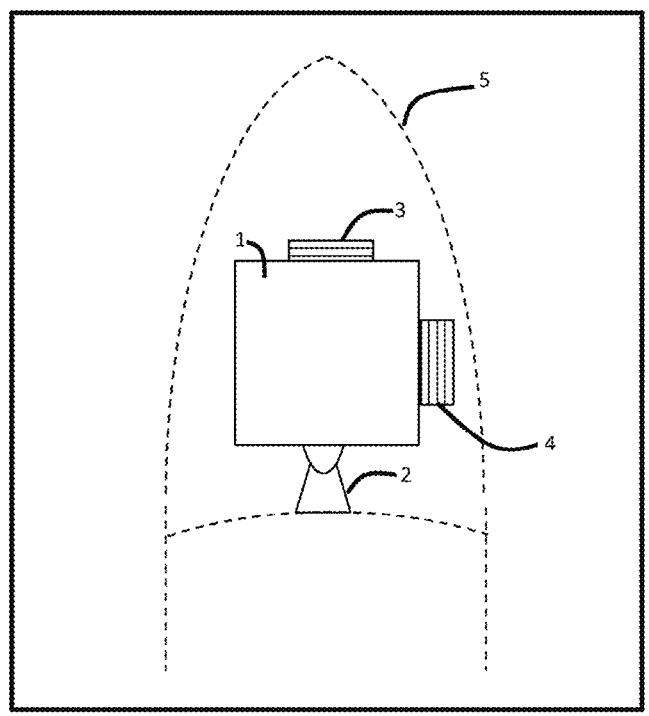
FIG. 1 is a schematic illustration of an embodiment of a spacecraft installed within a launch vehicle, wherein the various light-weight structures of the spacecraft are folded into compact configurations in accordance with aspects of this disclosure.

FIG. 1 illustrates an embodiment of an asteroid mining spacecraft, which can be positioned atop a launch rocket 5 (also referred to as a booster rocket) in accordance with aspects of this disclosure. The main body of the spacecraft 1, also called the bus, contains the fuel, electrical components, and communication equipment for a typical mission. The spacecraft 1 is further provided with one or more rocket propulsion systems 2 configured to provide maneuvering capability to allow the spacecraft 1 to reach and capture passing asteroids. The spacecraft 1 also contains an asteroid capture system 3 and a solar power collection system 4, both of which are shown in a folded and stowed configuration in FIG. 1. The booster rocket 5 is shown schematically by dashed lines.

Figure 2:
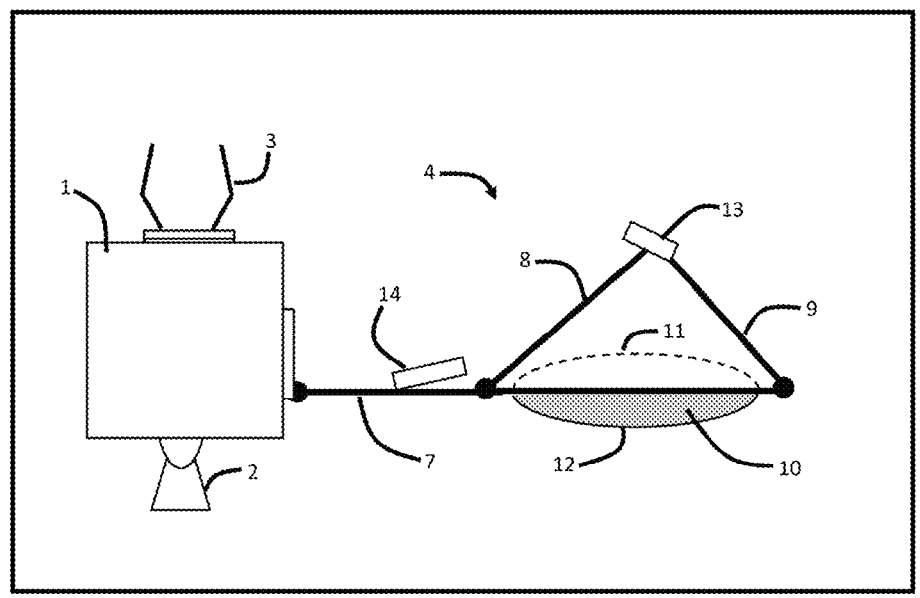
FIG. 2 is a schematic illustration of the orbiting spacecraft, wherein lightweight structures have been unfolded and deployed to operational configurations in accordance with aspects of this disclosure.

FIG. 2 depicts an embodiment the asteroid mining spacecraft 1 in orbital flight after it has separated from the booster rocket 5 in accordance with aspects of this disclosure. The asteroid capture system 3 is shown in a deployed configuration. In certain embodiments, the asteroid capture system 3 may include a plurality of multiply-jointed rigid members or may include a plurality of hollow tubular polymer membranes which have been inflated by internal gas pressure. However, aspects of this disclosure are not limited thereto and in other embodiments the asteroid capture system 3 can include other structure member(s) configured to be deployed in order to capture and contain asteroids.

With continued reference to FIG. 2, the solar power collection system 4 is shown after it has been unfolded and deployed from its compact stowed configuration. In certain implementations, the solar power collection system 4 comprises a plurality of linear support elements 7, 8, and 9 which may be embodied as tubular polymer membranes that have been inflated and held rigid by internal pressurizing gas. The solar power collection system 4 further comprises a hollow lens-shaped or inflated lenticular structure 10 which provides a transparent upper surface 11 and a curved reflecting lower surface 12. The lower surface 12 is configured to serve as a curved mirror to collect and focus incoming solar radiation. The solar power collection system 4 further comprises rigid reflecting elements 13 and 14 and may further include additional optical elements (not shown) which can be used to direct a focused energy beam.

Figure 3:
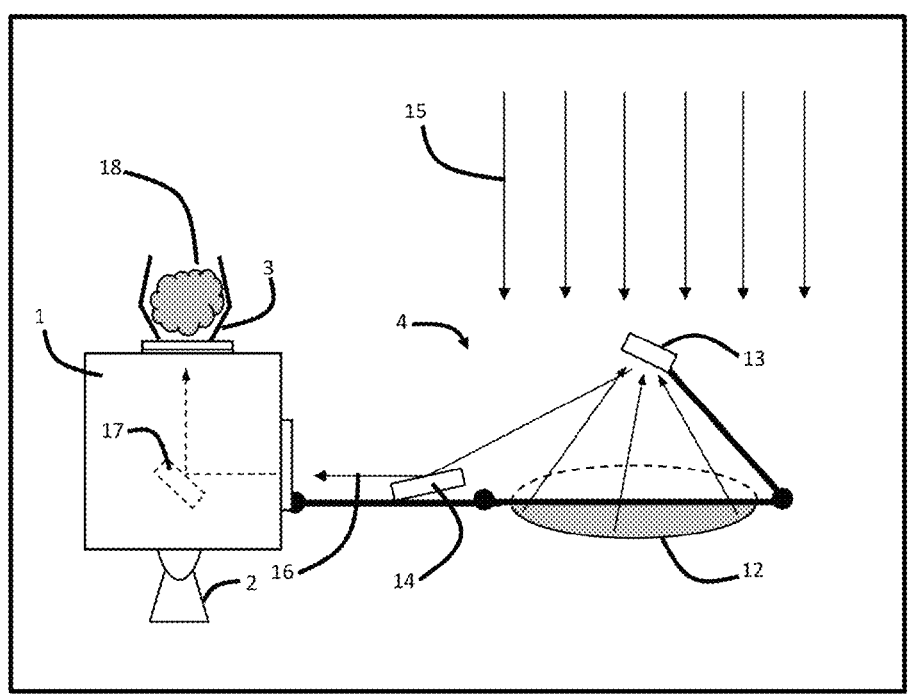
FIG. 3 is a schematic illustration of the collection and concentration of solar energy by light-weight reflecting structures in accordance with aspects of this disclosure.

FIG. 3 illustrates an embodiment of the solar power collection system 4 configured to collect solar energy and focusing the solar energy into a powerful energy beam. When the collecting curved mirror 12 is pointed directly at the Sun, a portion of the incoming solar radiation 15 reflects from the curved surface 12 and converges toward a secondary mirror 13.

With an unobstructed view of the Sun, the collection of solar energy using the configuration illustrated in FIG. 3 can collect very large power beams. For example, in an embodiment in which the mirror 12 has a collecting area of about 1 square meter, the continuous power collected can exceed one kilowatt of thermal energy for spacecraft at Earth's orbital distance from the Sun. When this energy is focused to a spot of several centimeters in diameter, the beam can have sufficient power density to drill a hole into concrete or into a captured asteroid. In certain implementations, collecting mirrors 12 having an area larger than about 1 square meter and multiple mirror configurations can collect proportionally larger power beams.

The additional rigid reflecting elements 13 and 14 are configured to adjust the focus and direction of the concentrated energy beam 16. Energy beam 16 can be directed into the spacecraft 1 via the rigid reflecting elements 13 and 14. The solar power collecting system 4 can further include one or more additional optical elements 17 configured to direct the beam 16 to pass through the spacecraft 1 to the asteroid capture system 3 and to impinge upon a captured asteroid 18. The concentrated solar energy can be used to drill holes into the asteroid, to melt and vaporize volatile constituents of the asteroid material, and to cause spalling and excavation of the asteroid surface. Thus, as used herein, the high power energy beam 16 may refer to an energy beam having sufficient power to drill a hole into the captured asteroid, to melt and vaporize volatile constituents of the asteroid material, and/or to cause spalling and excavation of the asteroid surface.

It can be seen from the above description that it is desirable to carefully focus a powerful energy beam 16 and direct the energy beam 16 to avoid hitting and damaging parts of the spacecraft 1 structure. That is, the energy beam 16 may have sufficient power to damage the spacecraft 1 if a portion of the beam 16 is inadvertently misdirected and strikes components of the spacecraft 1 which do not form part of the solar power collecting system 4. There are several conditions that may affect a dynamic misalignment of the beam 16. A non-exhaustive list of these conditions includes, for example, errors in pointing reflecting mirror 12 directly at the sun, mechanical deformations of light-weight structures 3 and 7-12 due to spacecraft 1 maneuvering forces, and/or slowly changing dimensions of the structures 3 and 7-12 due to material fatigue and/or due to pressurization loss caused by micro meteor impacts.

Therefore, it is desirable to provide techniques for continually monitoring the position and focus of energy beam 16. It is also desirable to incorporate shutters which can safely block or prevent the formation of an energy beam 16 during solar alignment maneuvers. It is also desirable to quickly block the energy beam 16 should there be unexpected upsets in any of the spacecraft control systems, a so called "dead man" automatic safety shutdown system.

In various embodiments of this disclosure, the spacecraft 1 can include one or more sensors configured to generate signals indicative of the alignment, misalignment, and/or degree of alignment of the energy beam 16. For example, solar power collecting system 4 can use the signals generated by the sensor(s) to realign one or more of the optical components that redirect the energy beam 16 in order to ensure that the energy beam 16 is not directed at other portions of the spacecraft 1. The one or more sensors may be configured to provide data for pointing and tracking information for solar power collection and may also provide warning alerts and shutdown commands whenever the energy beam 16 points in potentially damaging direction.

The one or more sensors can be implemented by various different embodiments. For example, the one or more sensors can use or be embodied as video camera(s) 19 as described in connection with FIG. 4 below. In some implementations, the sensor(s) can use or be embodied as a grid of fine wires 26 as described in connection with FIG. 7 below.

Figure 4:
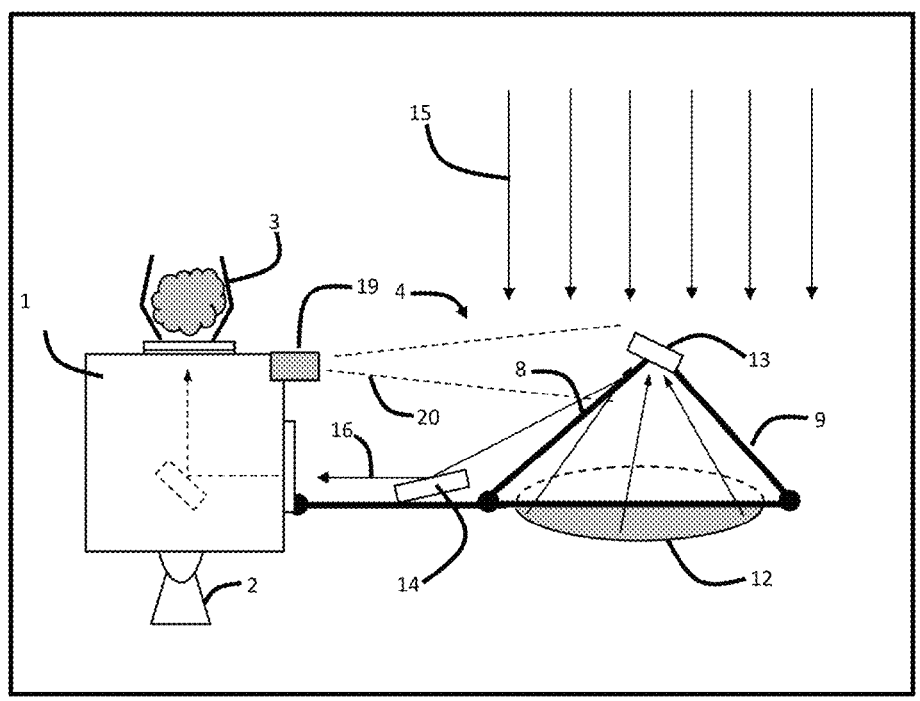
FIG. 4 illustrates a camera used to image the position of an energy beam on a polished optical surface in accordance with aspects of this disclosure.

Referring to FIG. 4, the spacecraft 1 includes a video camera 19 which may be placed in a convenient location upon the spacecraft body 1 or upon a supporting structure 7, 8, or 9. The camera 19 has a field-of-view 20, shown by broken lines in FIG. 4, which is directed to view the surface of reflecting element 13 while being simultaneously well away from the energy beam 16. If reflecting element 13 were a perfect mirror, none of the collected light in energy beam 16 would be scattered toward the camera 19. As a practical matter, virtually all polished mirrors diffusely scatter at least a small percentage of incident light into non-specular directions. Accordingly, the image seen by the camera 19 will be a diffuse glow located upon a region of the surface of element 13. If curved reflector 12 is perfectly aligned toward the incoming rays of sunlight 15, then the camera 19 image of the diffuse glow will be centered upon element 13. However, in the event that there is a small pointing error in the alignment of reflector 12, then the image glow will be displaced from the center of element 13. A displacement of the glow is an early warning measure of potentially damaging misalignment of the energy beam 16. Image processing software can readily detect the displacement of the glow image and provide signals to adjust the pointing direction of reflector 12. For example, in certain embodiments, the camera 19 may include one or more processors configured to run the image processing software in order to detect displacement of the glow image. In other embodiments, the spacecraft 1 can include one or more processors separate from the camera 19 configured to run the image processing software.

In a like manner, additional imaging cameras (not illustrated) may be placed to detect misalignments of the energy beam 16 on other reflecting surfaces along the path of the energy beam 16. Misalignment measurements at each imaged reflecting element can be used to correct the pointing accuracy of the preceding element in the optical path. Misalignment measurements by a plurality of imaging cameras can provide continuous adjustment of the high energy beam 16 during operation without requiring a system shutdown for calibration. In certain implementations, each of the plurality of cameras may include its own set of one or more processors configured to run image processing software to detect displacement of the respective glow images. In other implementations, each of the plurality of cameras may provide image data to one or more processors separate from the cameras which run the image processing software for each of the received video feeds.

Figure 5:
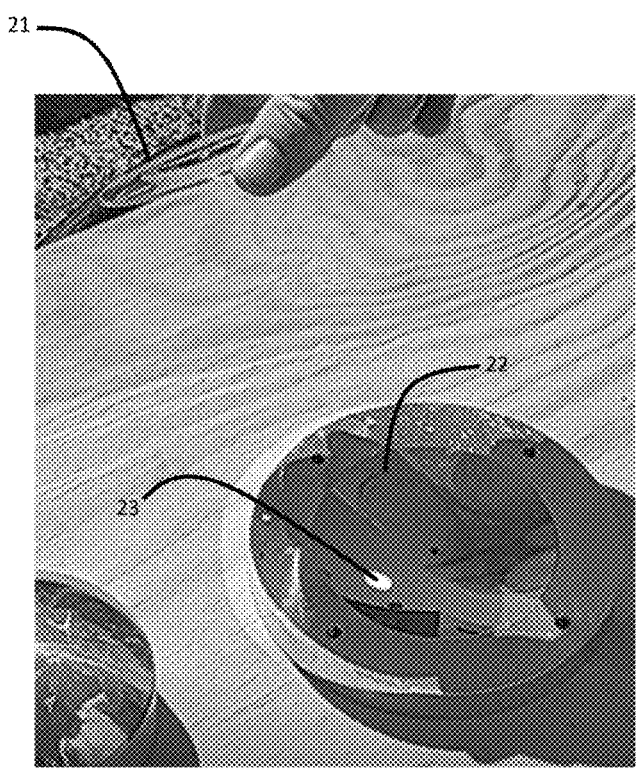
FIG. 5 is a photograph of scattering of high intensity light from a polished surface in accordance with aspects of this disclosure.

FIG. 5 is a photograph of the diffuse glow image upon a polished mirror in accordance with aspects of this disclosure. In this image, concentrated sunlight from a lens 21 is reflected from a concave mirror surface 22. The camera taking the image has been positioned to avoid the strong specular reflection. The diffuse glow can be clearly seen as a spot of light 23 that is not centered on the polished mirror.

Figure 6:
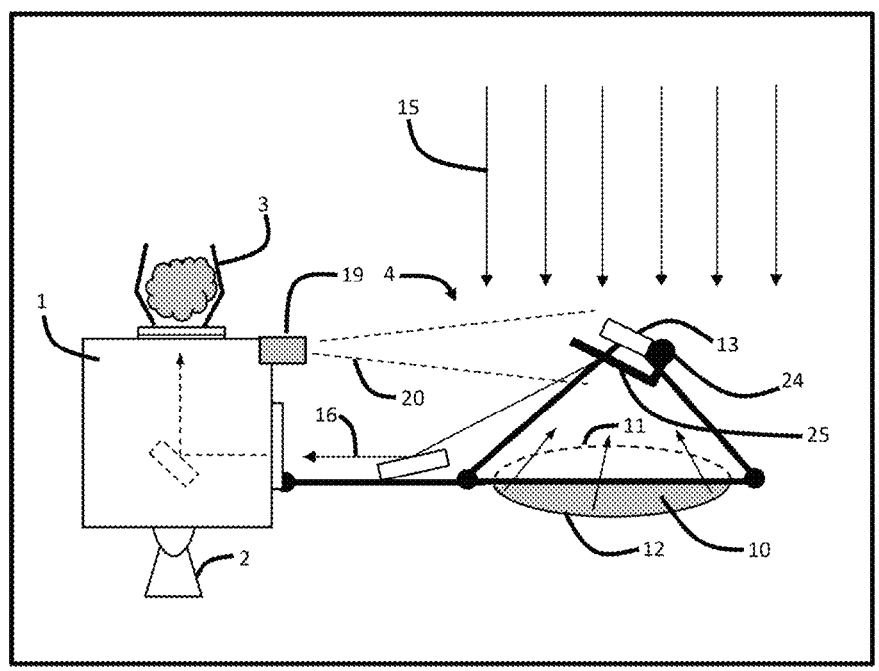
FIG. 6 illustrates a protective hinge and cover plate that can interrupt the formation of an energy beam in accordance with aspects of this disclosure.

Referring to FIG. 6 in a second embodiment, the spacecraft 1 includes a hinge 24 and cover plate 25 affixed to cover the front surface of reflecting element 13. In this configuration, converging rays from curved reflector 12 are prevented from reflecting and combining to form energy beam 16. Depending on the surface reflectance of cover plate 25, the incident light will be partially absorbed and partially diffusely reflected. As in the first embodiment of FIG. 4, the camera 19 will image a diffuse glow upon the surface of cover plate 23. The image position of the glow spot on the surface of the cover plate indicates the accuracy of alignment of curved surface 12 to the incoming solar energy 15 without requiring a reflection from element 13. In this manner, the curved surface 12 can be accurately aligned to the direction of the sun before a powerful energy beam 16 is directed further into the spacecraft 1. Furthermore, the curved surface 12 may be accurately aligned in the direction of the sun without need for a separate sun tracker or sun observing device.

With continued reference to FIG. 6 with the cover plate 25 in the blocking position as shown, a significant amount of solar energy 15 can be absorbed by the cover plate 25 thereby causing its temperature to rise. As the plate 25 heats, it will radiate long wavelength thermal energy in all directions. Nearby structures, such as the lenticular structure 10 with the transparent upper surface 11 will intercept a portion of the radiated thermal energy and also begin to warm. In this manner, lenticular structure 10 and other surfaces can be warmed as needed to prevent moisture or ice build that could potentially degrade the optical performance of these components. Since moisture may be produced during asteroid mining operations, it is desirable to heat optical surfaces as needed.

In some implementations, the cover plate 25 may be replaced or supplemented with another type of physical blocking element. For example, the physical blocking element may include one or more of the following: optical shutter(s), blocking plate(s), absorber(s), diffuser(s), and/or optical element(s) configured to deflect or defocus the energy beam 16.

Figure 7:
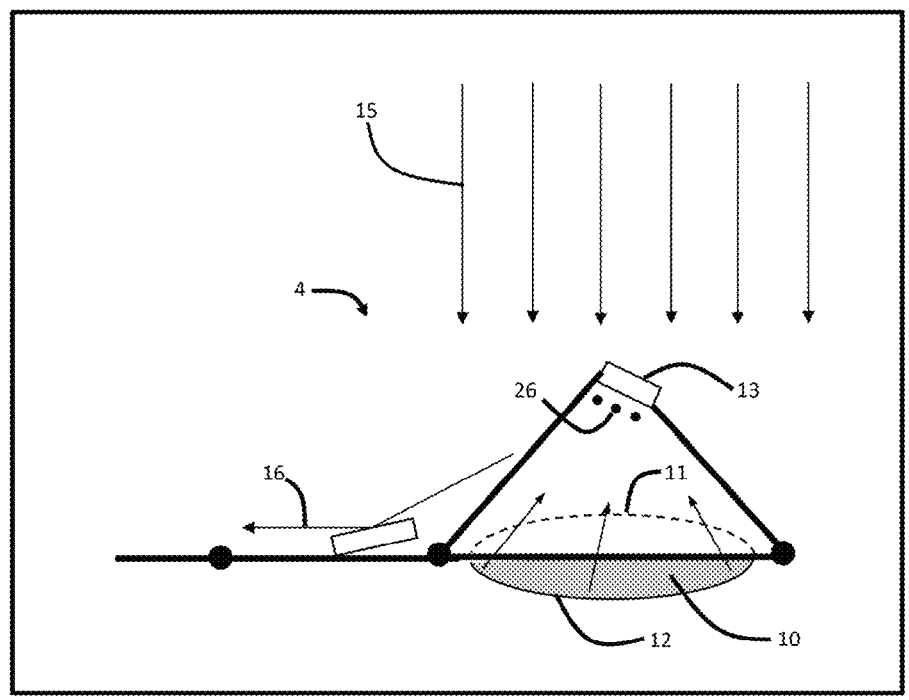
FIG. 7 illustrates a wire-grid sensor for measuring the centroid of a high energy beam of solar energy in accordance with aspects of this disclosure.

FIG. 7 illustrates a third embodiment of the solar power collection system 4 in accordance with aspects of this disclosure. As shown in FIG. 7, the solar power collection system 4 includes a grid of fine wires 26 placed near the reflecting surface of reflecting element 13. The wires 26 can be fabricated from materials which can tolerate high temperatures, such as tungsten or stainless steel. The wires 26 may have small diameters such as about 0.001 inch. The fine wires 26 intercept a small percentage of the converging solar radiation that is incident upon the reflecting element 13 and begin to warm. As the wires 26 are heated, their electrical resistance will increase. The wires closest to the center of the energy beam 16 will exhibit the largest resistance increases. The solar power collection system 4 can include one or more circuit configured to measure the resistance difference between adjacent wires 26, which provides information about directional misalignment of the energy beam 16. Very small resistance differences may be accurately measured by a common electrical circuit known as a Wheatstone Bridge. One or more processors may be configured to determine whether the energy beam 16 is misaligned based on the measured electrical resistances and provide control signals for repositioning and/or rotating the optical elements 10, 13, 16, 17 to correct the misalignment of the energy beam 16.

The solar power collection system 4 can include one or more actuators (not illustrated) configured to reposition and/or rotate one or more of the optical elements 10, 13, 16, 17 that generate and/or redirect the energy beam 16. Thus, the solar power collection system 4 can use the outputs received from the camera(s) 19 and/or the wires 26 as an input to control the alignment of the optical elements 10, 13, 16, 17 to ensure that the beam 16 is not directed onto any unintended components of the spacecraft 1, and thus, does not damage any components of the spacecraft 1.

Figure 8:
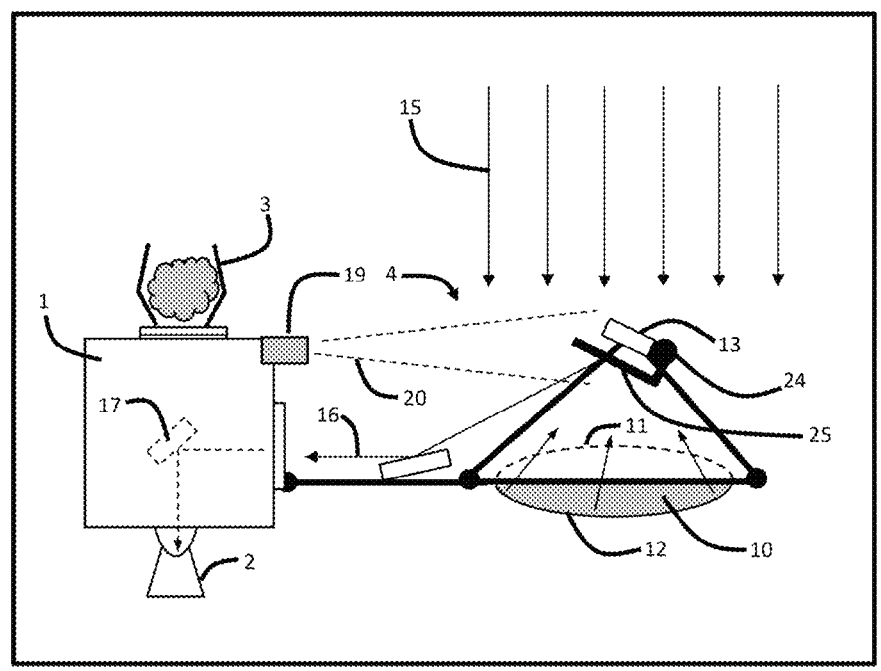
FIG. 8 illustrates an embodiment in which a turning mirror is configured to be rotated to direct the energy beam toward the rocket propulsion system in accordance with aspects of this disclosure.
Figure 9:
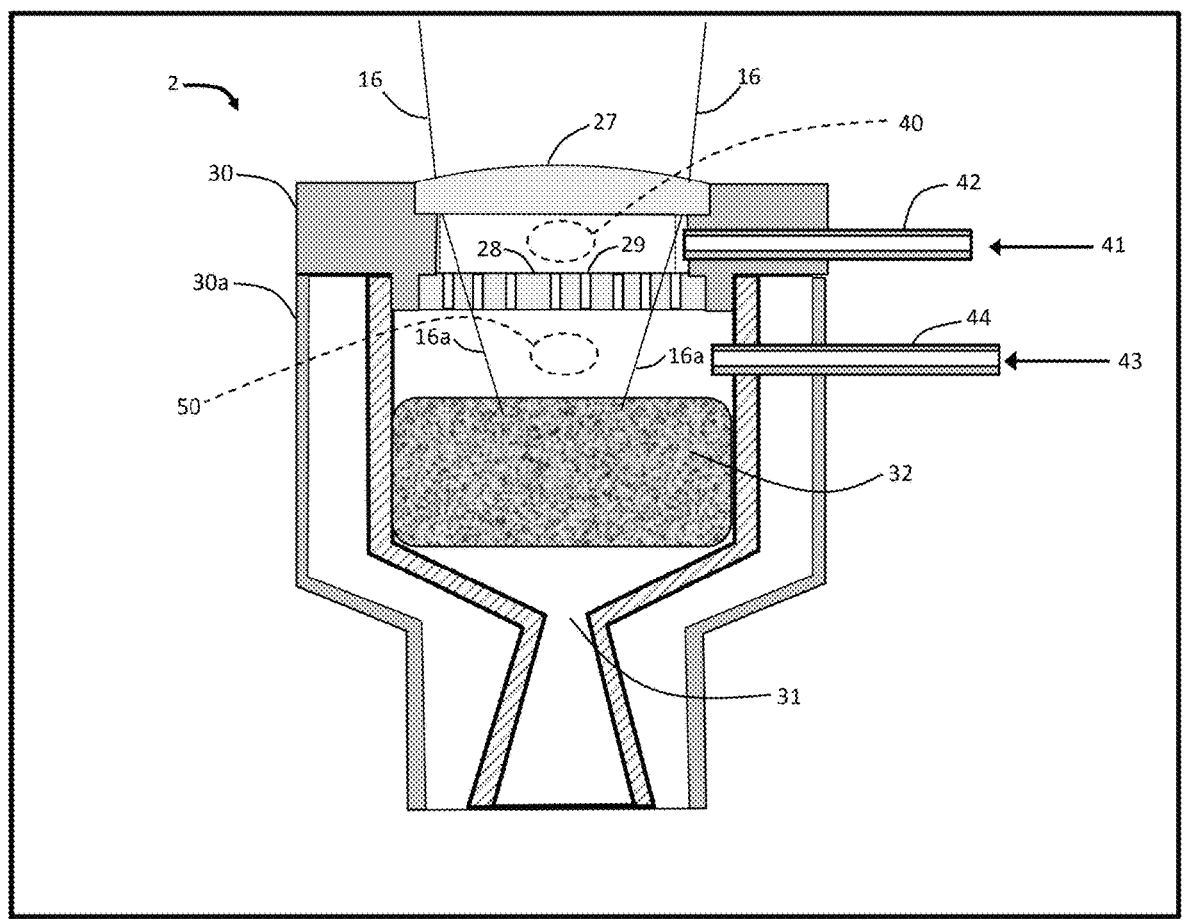
FIG. 9 illustrates internal structures of the rocket propulsion system in accordance with aspects of this disclosure.

FIG. 8 illustrates an embodiment in which a turning mirror 17 is configured to be rotated to direct the energy beam 16 toward the rocket propulsion system 2 in accordance with aspects of this disclosure. FIG. 9 illustrates internal structures of the rocket propulsion system 2 in accordance with aspects of this disclosure.

With reference to FIGS. 8 and 9, optical element 17 is embodied as a turning mirror 17 which can be rotated to selectively direct the energy beam 16 toward the rocket propulsion system 2 instead of towards the asteroid capture system 3. For example, the turning mirror 17 may be coupled to an actuator (not illustrated) configured to rotate the turning mirror 17 between a first orientation (e.g., as shown in FIG. 3) and a second orientation (e.g., as shown in FIG. 8).

The energy beam 16, represented in FIG. 9 within boundary rays, enters the rocket propulsion system 2 through two transparent windows 27 and 28. A first window 27 forms a pressure seal against components of the rocket propulsion system body 30 and 30a. The window 27 may have flat or curved surfaces forming a focusing lens. To reduce undesired optical reflections, one or both surfaces of the first window 27 may be coated with antireflection coatings.

The first window focuses and converges the energy beam 16 into a focused converging energy beam 16a, represented within boundary rays. The focused converging energy beam 16a passes through a second transparent window 28 and then into a heat exchanger 32.

The rocket propulsion system 2 is configured to heat a pressurized propellant gas to a high temperature and then expel the gas through a converging-diverging rocket nozzle 31 in order to produce useful rocket thrust. It is a general physical principle that most suitable propellant gasses are substantially transparent to solar energy. Thus, the gas will not efficiently absorb the wavelengths present in solar light.

The solid bulk material of heat exchanger 32 is designed to be an efficient absorber of solar energy, e.g., provided by the energy beam 16a. The incoming energy beam 16a heats the heat exchanger 32 to a high temperature, typically on the order of 2000 degrees Celsius. The heat exchanger 32 is also porous to allow the flow of propellant gasses through the heat exchanger 32. The heat exchanger 32 also contains a large internal surface area which, by heat conduction, efficiently transfers heat energy from the bulk material of the heat exchanger 32 to the propellant gas.

Highly concentrated solar energy in a small volume can produce temperatures far higher than the melting point of all known solid materials. Therefore, the focusing properties of first window 27 may be chosen to limit the concentration of solar energy to temperatures within the safe operating limits of the heat exchanger 32 and the surrounding structures 30a.

The second window 28 is spaced away from first window 27 by a predetermined distance. In some implementations, the distance between the first and second windows 27 and 28 may be on the order of 1 centimeter, however, in other implementations, the distance may be greater or less than 1 centimeter. In one illustrative embodiment, the distance may be 20 centimeters. In certain embodiments, the volume 40 contained between the two windows 27 and 28 forms a plenum configured to hold a pressurized propulsion gas. A first propulsion gas 41 can be injected into the plenum 40 through a first injector tube 42. In some embodiments, the second window 28 can include a plurality of small through-holes 29 which permit the first propulsion gas 41 to uniformly flow through window 28 into the volume of thrust chamber 50 in a two-dimensional pattern of linear jets.

One purpose of the first propulsion gas 41 is to provide cooling for both windows 27 and 28. The cooling gas reduces undesirable thermal stresses on both windows. Cooling reduces the probability of window fractures. Furthermore, cooling permits antireflection coatings to be applied to both windows, thereby increasing optical efficiency. Antireflection coatings generally have temperature limits that are lower than the temperature capabilities of solid materials and cannot be applied to excessively hot surfaces.

Similarly, a second propulsion gas 43 can be injected through a second injector tube 44 into the thrust chamber 50. Both of the gases 41 and 43 can be driven by their supply pressures to flow through the heat exchanger 32 and into the rocket nozzle 31. The temperature of the gases 41 and 43 and their thermal energy content (enthalpy) can be greatly increased by passage through the heat exchanger 32 (e.g., which provides heat from the energy beam 16a to the gases 41 and 43). The rocket nozzle 31 efficiently converts the random thermal motion and the relatively slow flow-velocity of hot gas molecules into linear motion in a high-speed exhaust plume, thereby producing rocket thrust.

The use of the two windows 27 and 28 and two injection gasses 41 and 43 provides a number of advantages over other thruster systems. One advantage is that many different types of gasses can be used to produce thrust in the rocket propulsion system 2. Examples of gases that can be used in the rocket propulsion system 2 include but are not limited to: $H_2$, $H_2O$, HF, Ar, $Cl_2$, Br, $CO_2$, $N_2$, $NH_3$, $CH_4$, mixtures of these gases, and a variety of volatile hydrocarbon molecules. Such gases can be derived directly from asteroid mining operations.

Another advantage is that many gas mixtures, when subjected to intense photochemical and thermochemical processes, may dissociate and recombine to produce opaque compounds. It is undesirable to allow opaque compounds to settle on the transparent window surfaces where they can block the energy beam 16. By injecting a relatively cool first propulsion gas 41 through the multiple holes 29 in the second window 28, a gas barrier can be formed near the surface of the second window 28. The outflow of the gas 41 can prevent turbulent gas flow from the propulsion gases 41 and 43 and various contaminants due to heat exchanger 32 reactions from reaching and contaminating the second window 28.

When exposed to extreme temperatures, some gases including $CH_4$ are known to deposit carbon compounds on nearby surfaces. This process is known as coking. According to aspects of the present disclosure, coking deposits may be removed by periodically injecting cleaning gasses such as $H_2$, HF, or $Cl_2$ singly or in combination through injection ports 42 and/or 44, providing yet another advantage to aspects of this disclosure.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "can," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description is not intended to be exhaustive or to limit the invention to the precise form disclosed above. While specific embodiments of, and examples are described above for illustrative purposes, various equivalent modifications are possible within the scope of the disclosed invention(s), as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings provided herein can be applied to other systems, not necessarily the system described above. The elements and acts of the various embodiments described above can be combined to provide further embodiments.

While certain embodiments have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. An apparatus for collecting solar energy and simultaneously protecting against damage from a resulting energy beam, the apparatus comprising:
   a solar energy collection system comprising at least one concentrator configured to focus the solar energy, a reflector configured to reflect the solar energy focused by the at least one concentrator, and a target configured to use, store, or convert the solar energy, the collection system configured to cause solar energy to focus on the target;
   at least one sensor comprising a grid formed of a plurality of wires located adjacent to the reflector and configured to detect misalignment of the concentrator by determining that some or all of the collected solar energy is offset from the target; and a safety system configured to shield other non-target systems from receiving too much solar energy from the collection system in response to the at least one sensor detecting the misalignment of the concentrator.

2. The apparatus of claim 1, wherein the safety system comprises one or more of the following: an optical shutter, a blocking plate, an absorber, a diffuser, and/or an optical element, and wherein the safety system is further configured to shield other non-target systems by deflecting and/or defocusing the collected solar energy.

3. The apparatus of claim 1, wherein the safety system is further configured to interpose a shielding structure with a response time that is shorter than the time for thermal damage to occur in the non-target systems.

4. The apparatus of claim 1, wherein the safety system is further configured to receive collected sunlight and radiate thermal energy in order to prevent moisture or ice build up on other portions of the solar energy collection system.

5. The apparatus of claim 1, wherein
the at least one sensor comprises at least one camera having a field of view directed at the reflector.

6. The apparatus of claim 1, further comprising:
a circuit configured to measure electrical resistances of each of the plurality of wires; and
one or more processors configured to:
receive the measured electrical resistances from the circuit, and
determine whether the focused solar energy is misaligned based on the measured electrical resistances,
wherein the solar energy collection system further comprises one or more actuators configured to adjust the position and/or rotation of the reflector based on the determination of whether the focused solar energy is misaligned.

7. A spacecraft comprising the apparatus of claim 1 and an asteroid capture system configured to capture an asteroid.

8. The spacecraft of claim 7, wherein the solar energy collection system is further configured to direct at last some of the collected solar energy into the captured asteroid.

9. The apparatus of claim 1, wherein the concentrator comprises a lenticular structure having a curved reflective surface configured to collect the solar energy and focus the collected solar energy into an energy beam, and the reflector is configured to redirect the energy beam.

10. The apparatus of claim 1, further comprising a spacecraft having a rocket propulsion system configured to provide rocket thrust, and the solar energy collection system is further configured to redirect the energy beam into the rocket propulsion system.

11. The apparatus of claim 10, the rocket propulsion system comprising:
a rocket nozzle,
a heat exchanger configured to heat a pressurized propulsion gas and expel the heated pressurized propulsion through the rocket nozzle,
a body enclosing the heat exchanger, and
a first transparent window configured to provide a pressure seal against the body and provide a controlled amount of focusing of the energy beam to the heat exchanger.

12. The apparatus of claim 11, the rocket propulsion system further comprising:
a second transparent window arranged within the body and spaced away from the first transparent window to form a pressurized plenum chamber between the first and second transparent windows,
wherein the plenum chamber is configured to receive a first propulsion gas injected therein,
wherein the second window has an array of holes formed therein configured to allow the first propulsion gas to flow out of the plenum chamber into a pressure chamber formed in the body and containing the heat exchanger, and
wherein the flow of first propulsion gas through the array of holes forms a substantially turbulence-free protective gas barrier near an output surface of the second transparent window.

13. The apparatus of claim 12, wherein:
the pressure chamber is configured to receive a second propulsion gas injected therein,
the first gas is configured to cool and remove contaminants from the first and second transparent windows, and
the second gas comprises a mixture of molecules derived from asteroid mining processes.

14. The spacecraft of claim 12, wherein:
the pressure chamber is configured to receive a second propulsion gas injected therein,
the first gas is configured to cool and remove contaminants from the first and second transparent windows, and
the second gas comprises a mixture of molecules derived from asteroid mining processes.

15. A method of using the apparatus of claim 1 to protect a spacecraft against damage from an energy beam, the method comprising:
collecting solar energy using the solar energy collection system;
generating an energy beam from the collected energy;
detecting misalignment of the energy beam using the at least one sensor; and
redirecting the energy beam using the one or more actuators.

16. The apparatus of claim 1, wherein the safety system comprises a physical element configured to selectively prevent the solar energy collection system from focusing the solar energy on the target in response to the one or more sensors detecting misalignment of the energy beam.

17. The apparatus of claim 16, wherein the physical element comprises one or more of the following: an optical shutter, a blocking plate, an absorber, a diffuser, and/or an optical element, and wherein the physical element is further configured to deflect and/or defocus the collected solar energy.

18. The apparatus of claim 16, wherein the physical element is further configured to prevent the solar energy collection system from focusing the solar energy on the target with a response time that is shorter than the time for thermal damage to occur in spacecraft structures.

19. The apparatus of claim 16, wherein the physical element is further configured to receive the collected sunlight and radiate thermal energy in order to prevent moisture or ice build up on other portions of the solar energy collection system.

20. An apparatus for collecting solar energy and simultaneously protecting against damage from a resulting energy beam, the apparatus comprising:
a solar energy collection system comprising:
a concentrator configured to focus solar energy,
a reflector configured to reflect the focused solar energy, and a target configured to use, store, or convert the solar energy, the collection system configurable to direct solar energy to the target;

one or more sensors configured to detect misalignment of the concentrator by determining that some or all of the collected solar energy is offset from the target, the one or more sensors comprising a camera having a field of view directed at the reflector;

a safety system configured to, in response to the at least one sensor detecting the misalignment of the concentrator, shield other non-target systems from receiving too much solar energy; and one or more processors configured to:
 receive image data from the one or more cameras,
 detect a location of a diffuse glow with respect to the reflector, and
 determine whether the focused solar energy is misaligned based on the detected location of the diffuse glow; and one or more actuators configured to adjust the position and/or rotation of the reflector based on the determination of whether the focused solar energy is misaligned.

21. The apparatus of claim 20, wherein the concentrator solar energy collection system further comprises a lenticular structure having a curved reflective surface configured to collect the solar energy and focus the collected solar energy into an energy beam, and the reflector is configured to redirect the energy beam.

22. A spacecraft comprising the apparatus of claim 20 and an asteroid capture system configured to capture an asteroid.

23. The spacecraft of claim 22, wherein the solar energy collection system is further configured to direct at least some of the collected solar energy into the captured asteroid.

24. The apparatus of claim 20, further comprising a spacecraft having a rocket propulsion system configured to provide rocket thrust, and the solar energy collection system is further configured to direct an energy beam into the rocket propulsion system.

25. The apparatus of claim 24, the rocket propulsion system further comprising:
 a rocket nozzle,
 a heat exchanger configured to heat a pressurized propulsion gas and expel the heated pressurized propulsion through the rocket nozzle,
 a body enclosing the heat exchanger, and
 a first transparent window configured to provide a pressure seal against the body and provide a controlled amount of focusing of the energy beam to the heat exchanger.

26. The spacecraft of claim 25, the rocket propulsion system further comprising:
 a second transparent window arranged within the body and spaced away from the first transparent window to form a pressurized plenum chamber between the first and second transparent windows, the plenum chamber configured to receive a first propulsion gas injected therein,
 wherein the second window has an array of holes formed therein configured to allow the first propulsion gas to flow out of the plenum chamber into a pressure chamber formed in the body and containing the heat exchanger, and
 wherein the flow of gas through the array of holes forms a substantially turbulence-free protective gas barrier near an output surface of the second transparent window.

27. A method of using the apparatus of claim 20 to protect against damage from an energy beam, the method comprising:
 collecting solar energy using the solar energy collection system;
 generating an energy beam from the collected energy;
 detecting misalignment of the energy beam using the one or more sensors; and
 redirecting the energy beam.

* * * * *